US006638457B2

(12) United States Patent
Inagaki

(10) Patent No.: US 6,638,457 B2
(45) Date of Patent: Oct. 28, 2003

(54) MANUFACTURING METHOD FOR HOLLOW PANEL

(75) Inventor: Takayoshi Inagaki, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 09/977,647

(22) Filed: Oct. 15, 2001

(65) Prior Publication Data

US 2002/0043743 A1 Apr. 18, 2002

(30) Foreign Application Priority Data

Oct. 16, 2000 (JP) ....................................... 2000-315075
Oct. 31, 2000 (JP) ....................................... 2000-333794

(51) Int. Cl.[7] .......................... B29B 11/12; B29C 43/18

(52) U.S. Cl. ....................... 264/113; 264/109; 264/112; 264/119; 264/241; 264/299; 264/319; 264/334; 264/337; 156/196; 156/212

(58) Field of Search ................................ 264/113, 278, 264/313, 112, 109, 119, 241, 299, 319, 334, 337; 428/34.2, 35.6; 249/64, 63; 156/196, 212

(56) References Cited

U.S. PATENT DOCUMENTS 4,581,190 A * 4/1986 Nagamoto et al. .......... 264/136
4,793,587 A * 12/1988 Berger ......................... 249/64
5,013,507 A * 5/1991 Julien et al. ................ 264/317
5,183,616 A * 2/1993 Hedrick ....................... 249/64
5,730,920 A * 3/1998 Marshall et al. ............ 264/279
5,736,218 A * 4/1998 Iwata et al. .............. 428/537.1
6,010,793 A * 1/2000 Yoshimura et al. ...... 428/537.1
6,129,871 A * 10/2000 Suzuki et al. ............... 264/112
6,265,037 B1 * 7/2001 Godavarti et al. ....... 428/297.4

FOREIGN PATENT DOCUMENTS

JP 6-71622 3/1994
JP 07324438 A * 12/1995 ............. E04C/2/30
JP 2000167813 A * 6/2000 ............ B27N/3/00
JP 2000-240363 9/2000

OTHER PUBLICATIONS

The American Heritage Dictionary, Fourth Edition, Copyright (c) 2000 by Houghton Mifflin Company. Accessed using http://www.dictionary.com, search term "bar".*
Roget's II: The New Thesaurus, Third Edition, Copyright (c) 1995 by Houghton Mifflin Company. See p. 390, "fiber".*

* cited by examiner

*Primary Examiner*—Stephen J. Lechert, Jr.
(74) *Attorney, Agent, or Firm*—Dickstein, Shapiro, Morin & Oshinsky, LLP.

(57) ABSTRACT

In a manufacturing method for hollow panels wherein highly rigid, lighter and various shapes of hollow panels constructed by layering board material made from fibers, wood elements, or wood strands can be obtained economically, wood strands on which a binder is added are layered with a plurality of cores, a thermal compression molding is performed on this layered material uniformly, cores are extracted after the thermal compression molding, and thus ribs and holes are formed in the panel. Also in the core is a bar which may be of irregular shape, and the core can be a combination of bars having the same or different cross sections. The cores are joined by joining boards in a direction of the short dimension of the core.

13 Claims, 8 Drawing Sheets

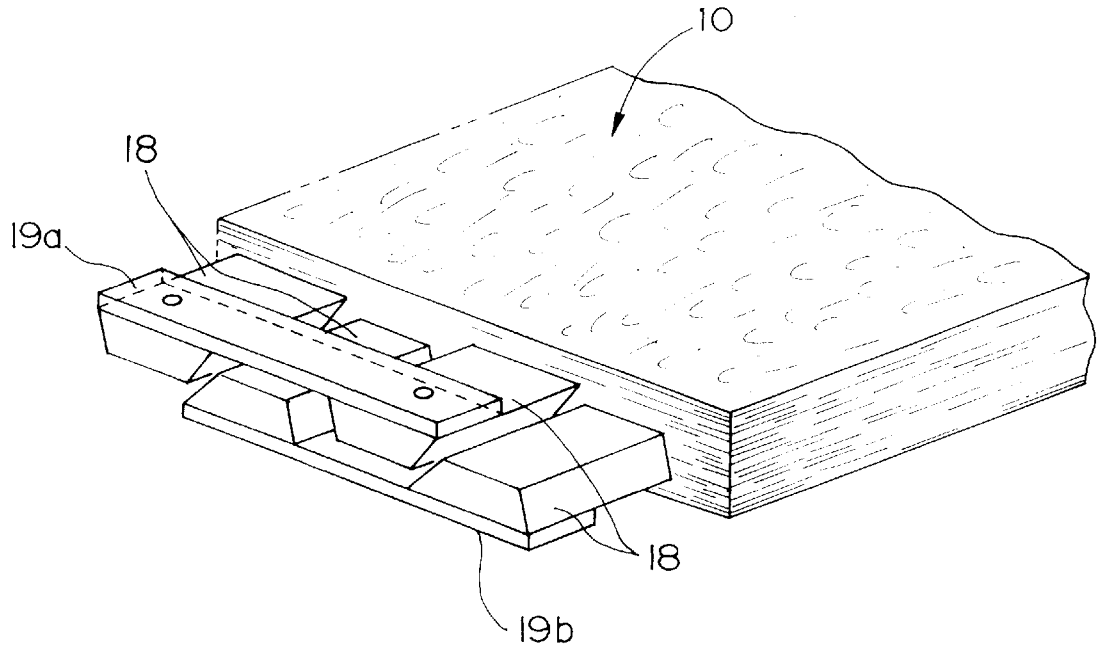
FIG. 9
FIG. 11A
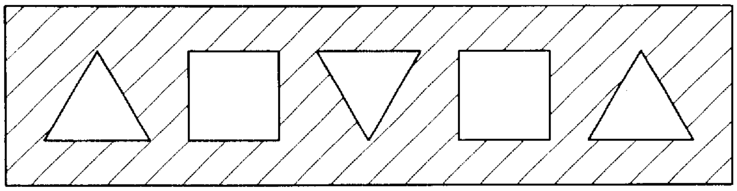
FIG. 11B
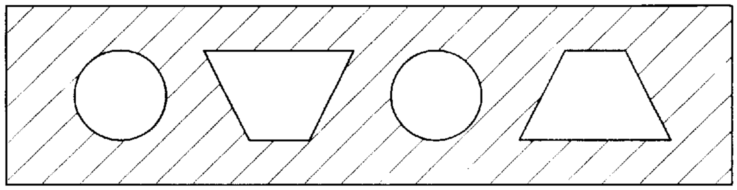

MANUFACTURING METHOD FOR HOLLOW PANEL

BACKGROUND OF THE INVENTION

1. Field of the Invention

The present invention relates to a manufacturing method for a hollow panel. The present invention particularly relates to a manufacturing method for obtaining highly rigid, lightweight hollow panels made by layering boards made from materials such as fibers or wood element.

2. Description of Related Art

According to the recent shortage of lumber resources, more attention is recently paid on the conservation of forests, thus deforestation will be less available for future. As far as board products such as block boards manufactured from a large volume of lumber resources is concerned, unstable supplies or shortages are anticipated, as well as increases in the market price. Consequently, wood panels made by utilizing wood strands which were conventionally a waste product and ligneous fibers made from scrap wood pieces are gathering more attention; therefore, the use of wood panels in areas in which block boards were conventionally used is anxiously desired.

Regarding such wood panels, for example, wood panels shown in FIGS. 12 through 14 are already known.

The wood panel shown in FIG. 12 is made by layering, on both sides of paper honeycomb 1, flat wood boards 2 and 2 which are thinner than the paper honeycomb 1.

The wood panel shown in FIG. 13 is made by layering, on both sides of a core material 3, surface layers 4 and 4 which are thinner than the core material 3 and which are made from a uniformly molded board made of bound wood strands which are made by binding the wood strands.

The wood panel show in FIG. 14 is made in such a way that corrugated resin molded board 5 is disposed between flat wood boards 6.

The advantage of wood panels shown in FIGS. 12 through 14 is their high rigidity and lightness; however, the high manufacturing cost because of the complicated manufacturing steps is a problem in such wood panels.

An object of the present invention is to provide a more economical manufacturing method for highly rigid, light, and variously shaped hollow panels made by layering the board made from materials such as fibers or wood elements.

BRIEF SUMMARY OF THE INVENTION

In the present manufacturing method for hollow panels, ribs and holes are formed by layering, with a plurality of cores, fibers and wood elements, to which binders are added, performing thermal compression molding on the layered materials, and extracting the cores after the thermal compression molding.

According to the present manufacturing method for hollow panels, the manufacturing steps are simplified by a uniform molding of medium layers and surface layers of the hollow panel. As a result, the manufacturing cost can be reduced, and the dimension of the holes in the hollow panels can be more precise. Also, a greater variety of hollow panel can be manufactured by combined use of a small number of cores. Also, the panels are light because of the hollow construction. This hollow construction helps improving heat insulating and soundproofing effects by means of the aerial layer in the holes. Also, the rigidity of the hollow panels can be enhanced by ribs formed between the holes in the hollow panel and by the walls at ends of the hollow panel. Also, according to the present manufacturing method for hollow panels, convex sections can be easily formed at a horizontal end of the hollow panel, and concave sections can be easily formed on the other horizontal end of the hollow panel for the purpose of uniting a plurality of panels. Also, according to the present manufacturing method for hollow panels, cables can be easily embedded in the ribs between holes.

In a second aspect of the manufacturing method for hollow panels, the wood elements are wood strands.

In a third aspect of the manufacturing method for hollow panels, the core is a combination of bars having irregular cross sectional shape.

In a fourth aspect of the manufacturing method for hollow panels, the core is a combination of bars of uniform cross sectional shape, or different between the bars.

In a fifth aspect of the manufacturing method for hollow panels, the cores are connected along the shorter direction of the cores by a connection board.

BRIEF DESCRIPTION OF THE DRAWINGS

FIG. 9 is a perspective view showing a part of the manufacturing step in the second embodiment of the present invention.

FIGS. 11A and 11B are cross sections showing other examples of hollow panels manufactured using the present manufacturing method for hollow panels.

DETAILED DESCRIPTION OF THE INVENTION

Embodiments of the present invention are explained as below. The present invention is not limited to these embodiments. Features of each embodiment can be combined with those of other, and the features of each embodiment can be combined with other known features.

Figure 1:
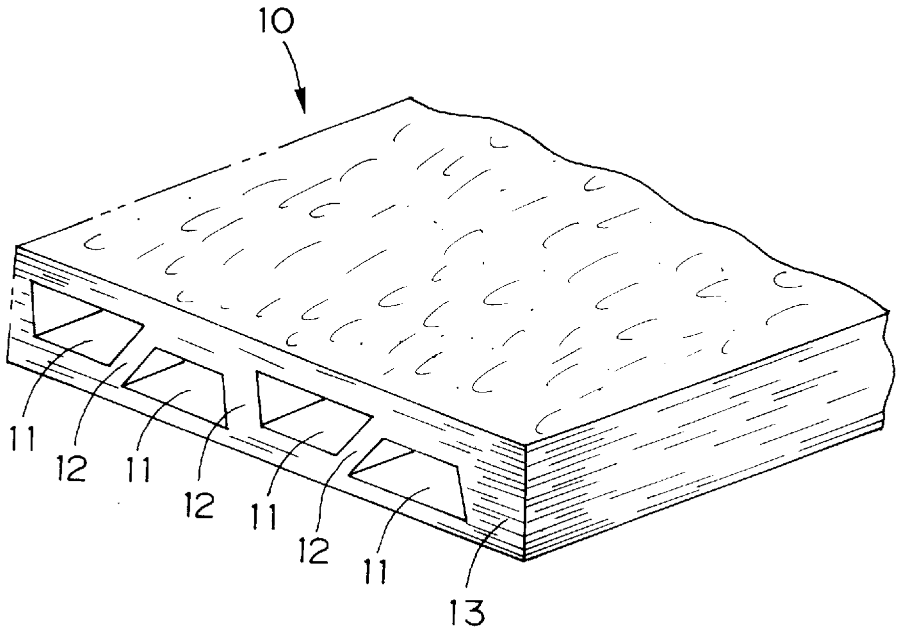
FIG. 1 is a perspective view of an example of hollow panels manufactured by the first embodiment in the present manufacturing method for hollow panels.

FIG. 1 is a perspective view of an example of panels manufactured using the present manufacturing method for hollow panels.

This panel 10 is made by adding binder to fibers or wood elements, by layering, with a plurality of cores, the fibers or wood elements to which this binder is added, performing the thermal compression molding uniformly on the layered materials, binding the layered materials uniformly, extracting the cores from the layered materials after the thermal compression molding, making a plurality of holes 11, which holes are separated by ribs 12, in the longitudinal direction of panel 10.

Fibers used in the present invention are herbadeous fibers such as those from grasses, stalks, and straw, or fibers (fleece) which can be obtained from unwoven cloths. Also as wood elements, material such as wood strands, ligneous fibers, wood chips, and wood particles can be used. Wood strands, in particular, meet the requirement for rigidity for use as a construction material.

A manufacturing method for hollow panels of the present invention is explained with reference to FIGS. 1 through 3 in which the wood strands are used.

The wood strands need not be specified to be of a particular type, and strands from conifers and from broadleaf trees can be used. More specifically, wood strands such as aspen, *Pinus radiata,* lodgepole pine, Japanese cedar, cypress, Japanese red pine, spruce, and Sakhalin fir can be mentioned. Lumber such as that from broadleaf trees and conifers may be processed by equipment such as a disc flaker (strand producing machine) into strands.

Wood strands to be used in the present invention have a thickness that is preferably between 0.05 through 1 mm and the average of the thickness is preferably between 0.1 through 0.45 mm, though the range of the thickness need not be specified to be only in the ranges. Here, the range of the thickness of the wood strands is between the minimum and the maximum of the thickness value of wood strands among 200 or more pieces of strands extracted randomly. The average of the thickness is an average of the thickness value of extracted wood strands. When the thickness of the wood strands is less than 0.05 mm, the panel molded by such wood strand is less strong and rigid. Also, because the forming volume before pressing is increased, productivity decreases and density increases after the molding process. In contrast, when the thickness of wood strands is more than 1 mm, flatness and smoothness of the surface of the panels is decreased.

Although the length of the wood strands need not be specified particularly, a desirable length is advantageously determined according to the shape of the molded panel. The range of lengths of the wood strand is preferably between 20 to 150 mm. The range of lengths of the wood strand is the range between the minimum length and the maximum length among 50 or more pieces of wood strands extracted randomly. The average length is an average of the lengths of extracted wood strands. More preferably, the length of each wood strand should be between plus or minus 10 mm of the average.

Also, the width of the wood strands is preferably between 1 to 50 mm, and the average of the width is preferably between 5 to 35 mm. Here the range of widths of the wood strand is a range between the minimum width and the maximum width of 50 or more pieces of wood strands randomly extracted, and the average of width is an average of widths of extracted wood strands. When the width of wood strand is less than 1 mm, the strands do not adhere sufficiently in the width direction, and thus the strength of the panel is decreased. In contrast, when the width of the wood strands is more than 50 mm, wood strands tend to curl or bend, thus the binder reaches to the inside of such curled or bent part insufficiently in the mixing process of binder. Also, the air is insufficiently voided in the forming process; thus such air tends to remain in the panel as voids (air bubbles). As a result, wood strands moves, and furthermore, the flatness and smoothness of the panel obtained in such a condition is decreased.

Although the disposition of wood strands forming a panel 10 need not be specified particularly, wood strand can be disposed such that the direction of the grain is generally arranged in one direction, and wood strands can be layered in three layers.

More specifically, direction of the grain of wood strands layered under the top layer can be perpendicular to the direction of the wood strands in top layer of the three layers, and the direction of the grain of wood strands layered under the second layer can be parallel to the direction of the wood strand in the top layer of the three layers. The ratio of wood strands to be disposed in one direction can be determined according to the required strength and the rigidity of panel 10. The directions of the grains of wood strands can be random.

As a binder to be used in the present invention, a resin such as a foaming binder resin which spontaneously forms, non-foaming binder resin, and mixtures of these resins can be used. Among these binders, a foaming binder resin is preferably used. When a foam binder resin is used, the resin exists only at the crossing point of wood strands, and foam cells widen the voids between wood strands. Thus the quantity of resin used in a panel 10 can be decreased, and as a result, a less dense hollow panel 10 can be obtained. Also foam cells help improving the heat insulating and soundproofing effect of the panel 10.

As a form binder resin, any mixed form resin made of non-foam resin such as form resin which spontaneously forms, or phenol resin, urea resin, epoxy resin, or acrylic resin, with forming agent may be used. From the viewpoint of obtaining a hollow panel with improved rigidity and lower density, a form binder resin should be preferably made of form resin which spontaneously forms. As a form resin which spontaneously forms, form polyurethane resin, form isocyanate resin, or more preferably a form PMDI (Polymeric 4,4'-methylenedianiline, or crude MDI) can be used. Form polyurethane resin and isocyanate resin reactive with moisture, and a time necessary for thermal compression can be shortened by virtue of the faster reaction due to the self-foaming of isocyanate group (—NCO) with moisture.

Adhesion of the binder is particularly strong when a forming PMDI is used. Also PMDI foams and cures at a lower temperature; thus the time necessary for thermal compression is reduced. More specifically, the temperature for thermal compression can be lowered to a range between 140° C. and 200° C., or furthermore, to a range between 140° C. and 180° C. Also, because the compression time can be generally determined by a formula such as "intended thickness of a board (mm)"×"10 to 15 seconds"; therefore the thermal compression step can be shortened. Also, when PMDI is used as a binder, decomposition of a mold releasing agent can be constrained due to the thermal compression temperature as low as between 140° C. and 180° C.; thus, the panel becomes easily releasable from the mold, and the molding operation is more efficient.

The ratio of the binder and the wood strand, both of which forms the panel 10 should preferably be 100 parts per weight (absolute dry weight) of the wood strand and 3.5 to 20 parts per weight of binder. Density and strength of a panel 10 can be modified by changing the amount of binder added.

Hardener, hardening catalyzer, hardening accelerator, diluent, viscosity reinforcer, dispersant, and water repellant agent can be added to the binder as necessary.

Wood strands should be preferably acetylated in advance. When acetylating the wood strands, wood strands should be preferably acetylated in a gas phase (acetylated degree 12 to 20%) by contacting a vapor such as acetic acid, acetic anhydride, chloroacetic acid after the wood strands are dried until the water content of the wood strands becomes 3% or lower, or more preferably 1% or lower. As above, when wood strands are acetylated, the wood strands become resistant, and thus the panel 10 is of stable size.

Next, binder is added at the surface of wood strand in order to unite the wood strands. When mixing the wood strands and the binder, spray application methods are usually used. More specifically for example, a method such that the wood strand size and water content of which are adjusted as above is entered into a low speed rolling drum and the binder is sprayed towards the wood strands while wood strands are free-falling in this rolling drum is preferable.

When the binder is applied on the wood strands by means of a spray method, the binder is dissolved in a solvent before being applied. As long as a spraying device can apply the binder such that the binder is spread very flat, the dilution by a solvent is not necessary.

Next, the wood strand to which the binder sticks becomes the panel 10 by forming by means of a press molding machine after the solvent in the binder such as water and acetone is dried and removed.

Figure 2:
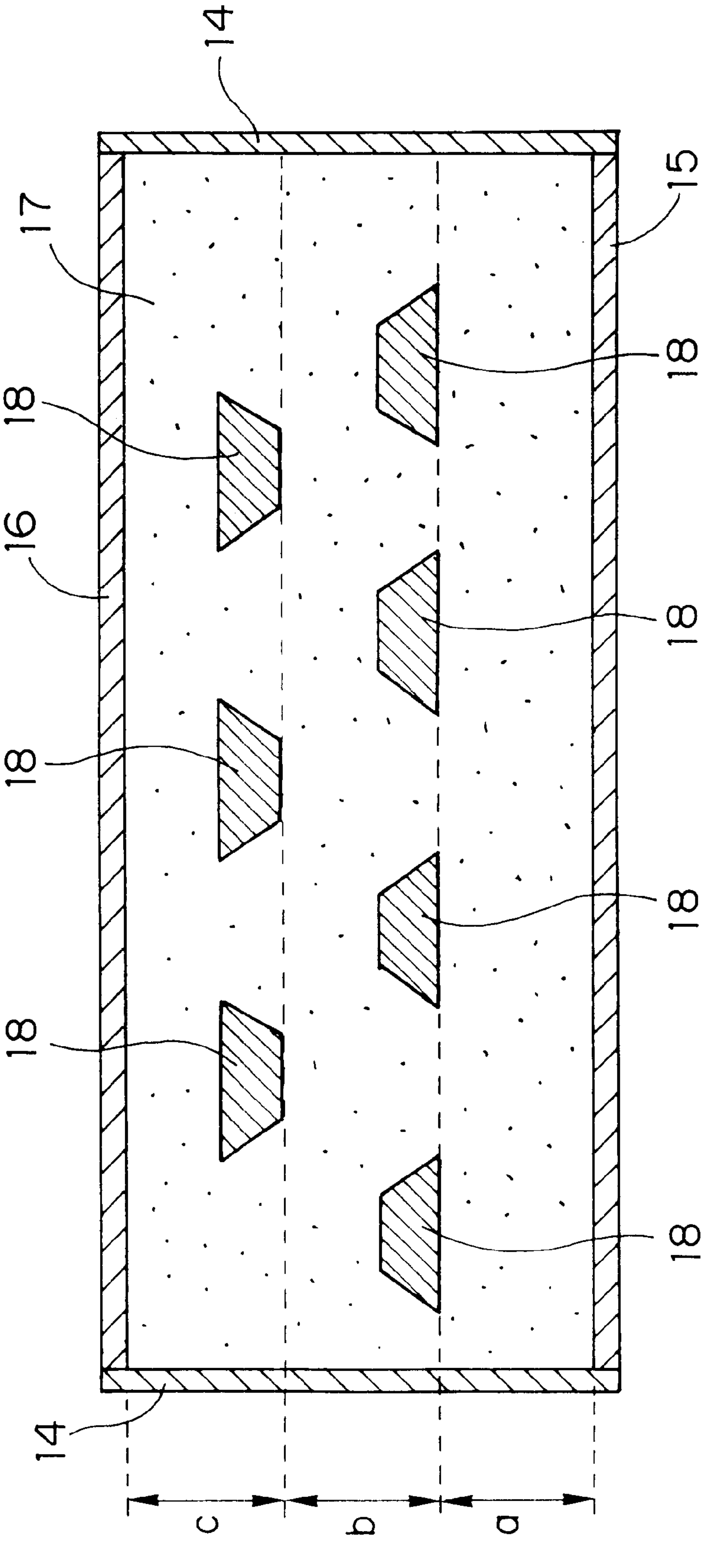
FIG. 2 is a cross section showing a part of the manufacturing step of the first embodiment.

As shown in FIG. 2, forming board 15 is put on the bottom of forming frame 14 which size is 800 to 2500 mm length, 800 to 1300 mm width, and 50 to 300 mm height, then wood strands 17 on which a binder which forms flattened bottom section of the panel 10 is applied is spread to form a first layer ("a" in the drawing).

Consequently, cores 18 which are aluminum bars of trapezoidal cross section are disposed at constant intervals to form holes 11 as shown in FIG. 1 on the first layer of wood strands 17. Then the wood strands 17 forming the panel 10 are spread on the cores 18 to form a second layer ("b" in the drawing). After that, the cores 18 are disposed on the second layer of wood strands 17 such that the cores 18 on the second layer face the cores 18 on the first layer at a constant interval. In this disposition, the trapezoidal cross sections of cores 18 on the second layer are inverted relative to the trapezoid cross sections of cores 18 on the first layer. Furthermore, the wood strands 17 forming upper flattened sections of the panel 10 are spread on these cores 18 of the second layer to form a third layer ("c" in the drawing).

Next, a forming board 16 is put on the third layer. As a core to be used in the present invention, the section of the core is not specified to only be trapezoidal, and also it may employ bars of irregular cross section. Also, the size of the section of the core is preferably determined according to the thickness of the panel to be formed. The cross section of the bar should be preferably the same over the entire length of the part which functions as a core. Also the cross section of the bar can be tapered such that the cross section size at the extraction end of the bar is larger than the cross section size of the other end.

Also, a core to be used in the present invention should be preferably made of material which does not deform nor decompose by heat and compression added in thermal compression molding.

Next, the thermal compression molding is performed to the layered material which is made of layers of wood strands 17 as above under the conditions of temperature 140 to 220° C. and pressing force 15 to 40 kg/cm$^2$ for 6 to 15 minutes.

Panel 10 made of wood strands united by binder can be obtained by performing the thermal compression molding on the layered material of wood strands 17 until the thickness of the layered material is compressed to ⅓ to 1/30 of the thickness before compression.

Figure 3:
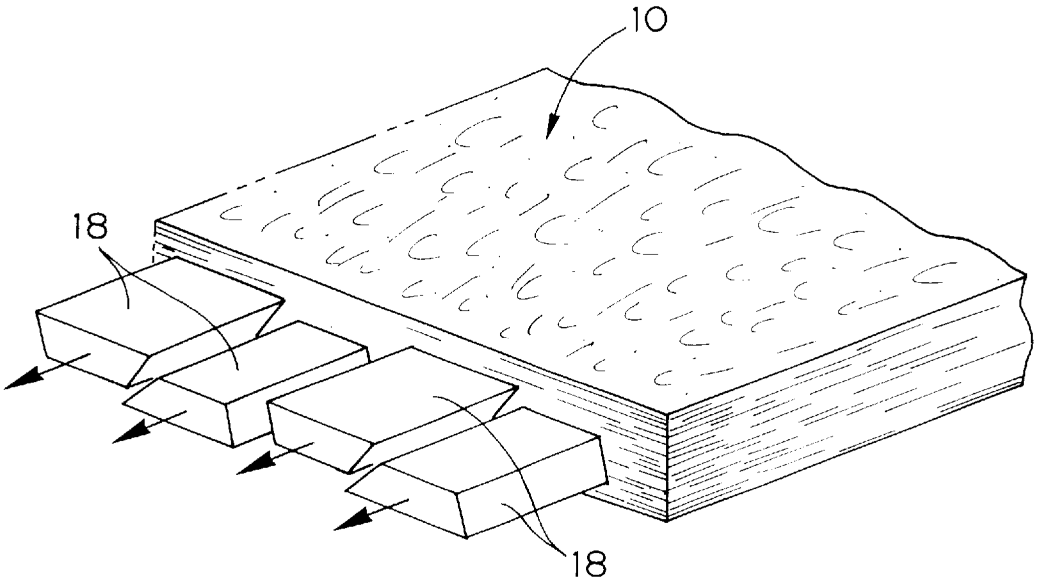
FIG. 3 is a perspective view showing a part of the manufacturing step of the first embodiment.

Next as shown in FIG. 3, after the panel 10 which was molded in thermal compression is cooled down, the cores 18 are extracted from the panel 10. Consequently after extracting the cores 18, the hollow panel 10 is obtained by trimming the margin of the panel 10. A device such as a tip saw is used to trim the surface of the panel 10.

The density of the panel 10 manufactured in this way is preferably 0.3 to 1 g/cm$^3$ and more preferably 0.5 to 0.8 g/cm$^3$; thus, such a hollow panel is an MDF (Medium Density Fiberboard) such as a hard board, particle board, flake board, random strand board, and wafer board.

According to the manufacturing method for the hollow panel of the present invention, the medium layer of the panel 10 and the surface layer of the panel 10 can be molded uniformly; thus, the manufacturing steps can be simplified and the manufacturing cost can be reduced. Also the panel 10 is hollow; thus, the panel 10 can be lighter. Also, the holes 11 in the hollow section are air spaces, and the heat insulating and soundproofing effects are improved. Also, because the ribs 12 are formed between holes 11 of the panel 10, and because the horizontal ends 13 of the panel 10 becomes walls, the rigidity of the panel 10 is improved.

Figure 4:
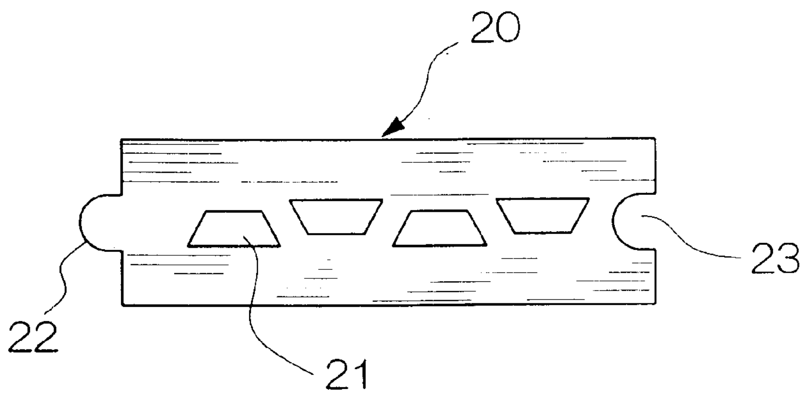
FIGS. 4 through 6 are views showing hollow panels manufactured by other embodiments of the present invention.

Also according to the present invention, as shown in FIG. 4, a hollow panel 20 having a joining convex section 22 at a horizontal end, a joining concave section 23 at the other horizontal end and holes 21, can be easily obtained. A convex section 22 and a concave section 23 can be formed by a cutting operation such as milling after the panel is formed as above. When the wood strands are selected according to the length or the size of the wood strands, the surface of the end of the panel can be formed to be smooth, and convex section 22 and concave section 23 can be formed easily. When molding uniformly, if a forming section of joining convex section 22 and joining concave section 23 are arranged in the forming frame of the panel 20, a more uniform thermal compression molding can be performed as easily as by the manufacturing method for the hollow panel shown in FIG. 2.

Figure 5:
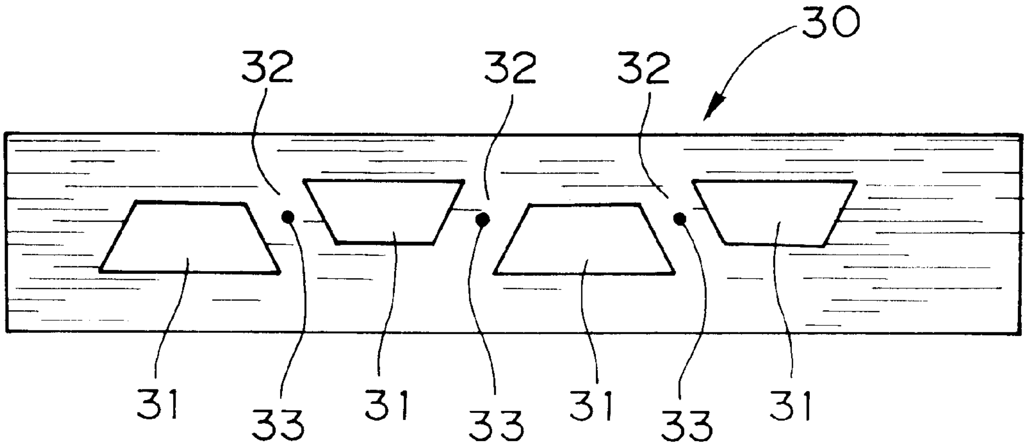

In a panel 30, shown in FIG. 5, a cable 3 is embedded in a rib 32 between holes 31.

Panel 30 is obtained by disposing the cable 33 and the core 18 in parallel near the cores 18 when disposing the cores 18 shown in FIG. 2, and then performing the uniform molding by the thermal compression molding. Cable 33 can be telephone wire, optical fiber, and electrical wire.

Figure 6:
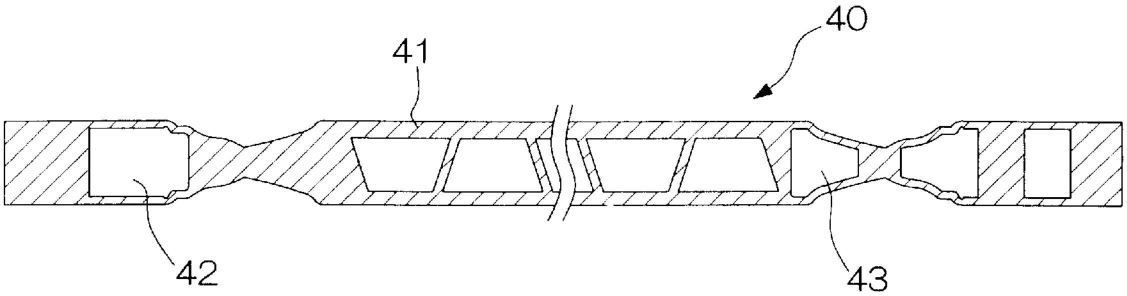

Also, by the present invention, as shown in FIG. 6, a panel 40 having an indented section on the surface can be uniformly molded.

In this case, the indented section of the panel 40 is formed on the forming board to be used for forming the panel 40, then the panel 40 can be molded uniformly by using the irregularly shaped core as easily as by the manufacturing method for the hollow panel shown in FIG. 2.

Alternatively, the panel 40 can be obtained by uniformly molding a hollow panel having holes 41, 42, 43 with the shapes shown in FIG. 6 in the thermal compression molding, then by forming the indented section by milling the surface of the hollow panel.

A panel 40 obtained in this way may be used for an ornamented board for precut products such as doors.

Figure 7:
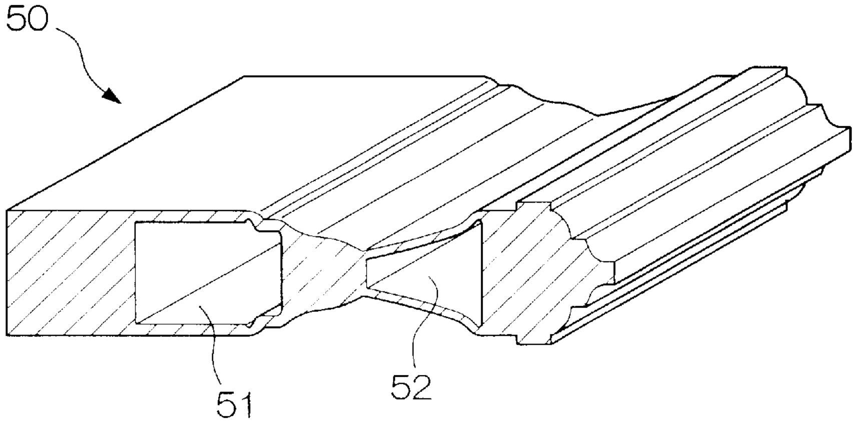
FIG. 7 is a perspective view showing hollow panels manufactured by other embodiments of the present invention.

Also by the present invention, as shown in FIG. 7, a panel 50 having an indented section on the surface can be uniformly molded. In this case, the indented section of the panel 50 is formed on the forming board to be used for forming the panel 50, then the panel 50 can be molded uniformly by the thermal compression molding using the irregularly shaped core as easily as by the manufacturing method for the hollow panel shown in FIG. 2.

Otherwise, the panel 50 can be obtained by uniformly molding a hollow panel having holes 51 and 52 with the shapes shown in FIG. 7 in the thermal compression molding, then by forming the indented section by milling the surface of the hollow panel.

A panel 50 obtained in this way may be used for a framework of a door, a frame for a picture, and a decorative molding.

Next, the second embodiment of the present invention is explained as follows.

FIG. 1 is a perspective view of an example of panels manufactured with the present manufacturing method of hollow panels shown in the first embodiment. The second embodiment is explained with reference to this FIG. 1.

This panel 10 is also made adding binder to fibers or wood elements, layering, with a plurality of cores joined by a joining board in the direction of the shorter dimension of the cores, fibers or wood elements to which this binder is added, performing the thermal compression molding uniformly on this layered material, binding the layered material uniformly, extracting the cores from the layered material after the thermal compression molding, making a plurality of holes 11, which holes are separated by ribs 12, in the longitudinal direction of panel 10.

The descriptions regarding the size and the material of the wood strand, acetylating treatment, and binder resin to be used in the panel 10 are omitted because the descriptions are the same as in the first embodiment.

Figure 8:
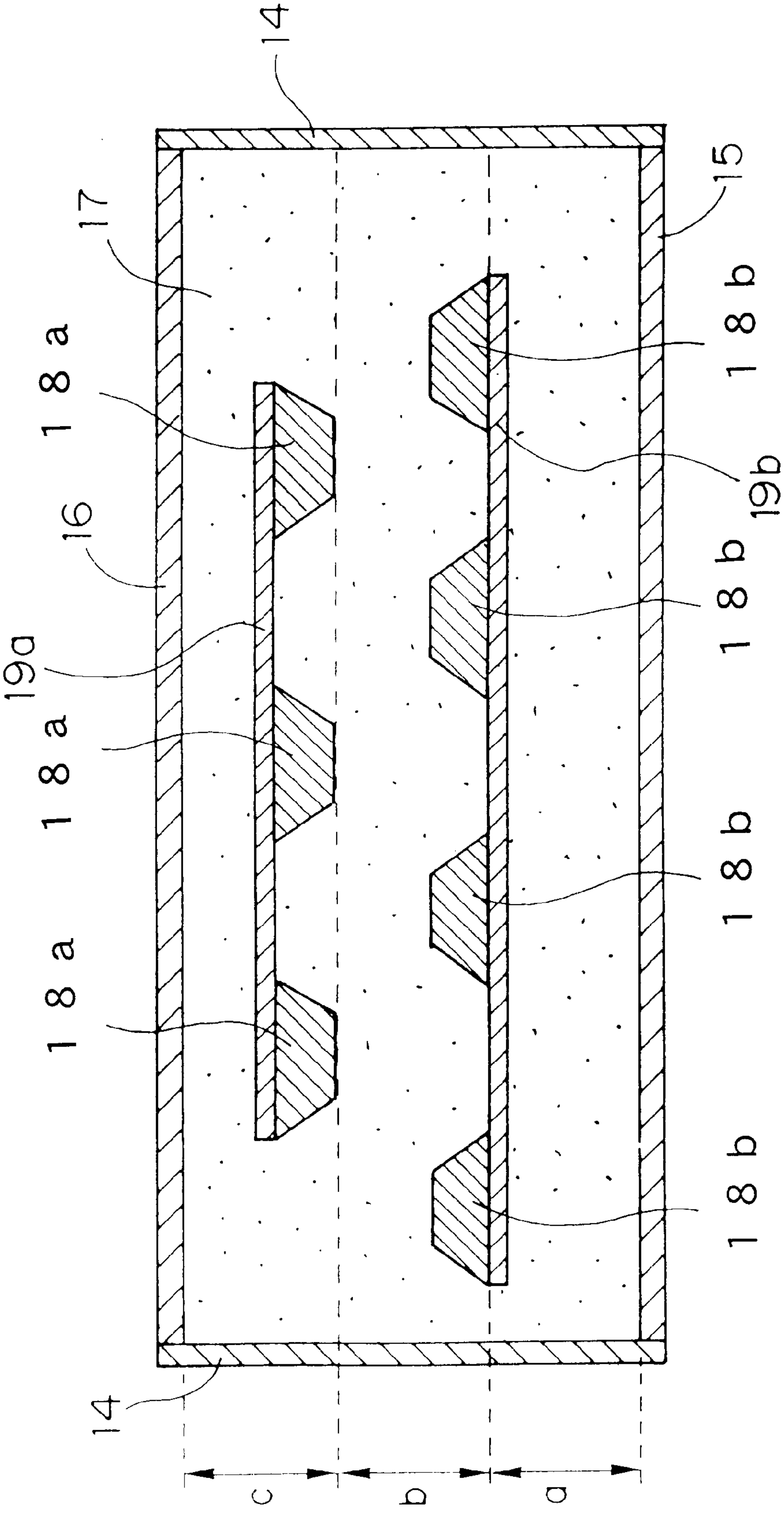
FIG. 8 is a cross sectional view showing a part of manufacturing step of the second embodiment in the manufacturing method for hollow panels.
Figure 10A:
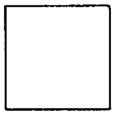
FIGS. 10A through 10I are front views of cores used in the present manufacturing method for hollow panels.
Figure 10B:
Figure 10C:
Figure 10D:
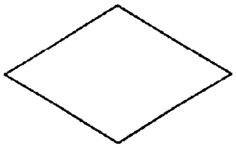
Figure 10E:
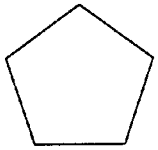
Figure 10F:
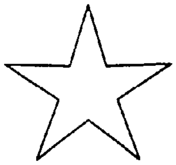
Figure 10G:
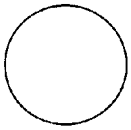
Figure 10H:
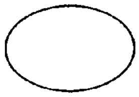
Figure 10I:
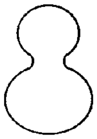
Figure 12:
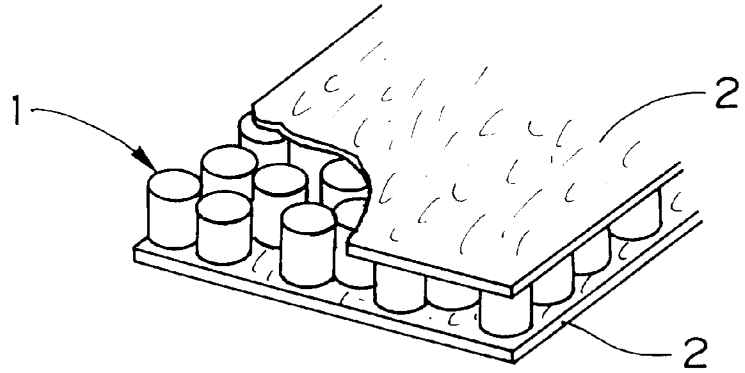
FIG. 12 PRIOR ART
FIGS. 12 through 14 are perspective views showing examples of conventional wood panels.
Figure 13:
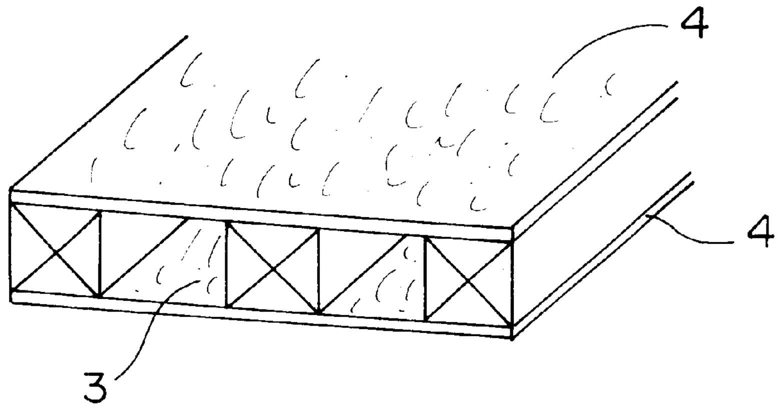
FIG. 13 PRIOR ART
Figure 14:
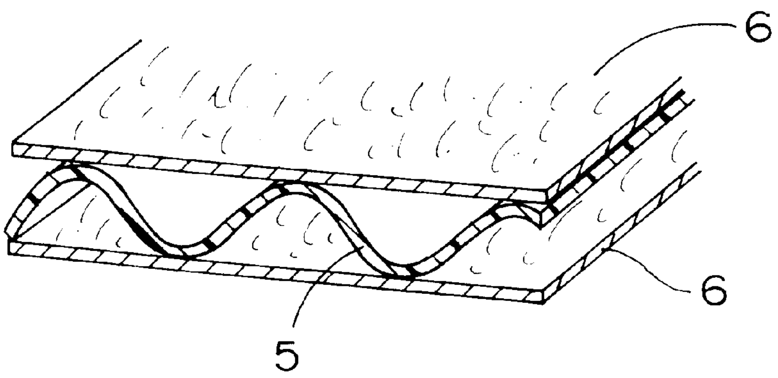
FIG. 14 PRIOR ART

The feature of the second embodiment is that the cores are joined with a constant interval by a joining board. As shown in FIG. 8, forming board 15 is put on the bottom of forming frame 14 which size is for example 800 to 2500 mm length, 800 to 1300 mm width, and 50 to 300 mm height; then wood strands 17 on which a binder which forms a flattened bottom section of the panel 10 is applied is spread to form a first layer ("a" in the drawing).

Consequently, cores 18 which are trapezoidal cross section aluminum which are joining in constant interval in advance by a joining board 19*a* are disposed to form holes 11 in FIG. 1 on the first layer of wood strands 17. Also, as shown in FIG. 9, joining boards 19*a* and 19*b* join cores 18 in the distant position from the end surface of the hollow panel 10 such that the wood strands are not layered on the joining boards 19*a* and 19*b*. Also, the joining boards 19*a* and 19*b* are made of aluminum, iron, or stainless steel, and the thickness of the joining boards 19*a* and 19*b* is 3 to 10 mm. The joining boards 19*a* and 19*b* are joined to the cores 18 by means of bolts.

The cores 18 are joined by the joining boards 19*a* and 19*b,* and thus the holes 11 of the hollow panel 10 are formed very precisely. Then the wood strands 17 forming the panel 10 are spread on the cores 18*a* to form a second layer ("b" in the drawing).

Next, the cores 18*b* joined in constant interval by the joining board 19*b* are disposed on the second layer of the wood strands 17. When combining the cores 18*b,* the cores 18*b* are disposed in intervals of the cores 18*a*. The direction of the trapezoids of the cores 18*b* is inversed to the direction of the trapezoids of the cores 18*a* on the first layer. Furthermore, the wood strands 17 forming the upper flat section of the panel 10 is spread on the cores 18*b* to form a third layer ("c" in the drawing).

Next, a forming board 16 is put on the third layer.

Consequently, the thermal compression molding is performed to the layered materials which is made of layers of wood strands 17 as above in the condition of temperature 140 to 220° C. and pressing force 15 to 40 kg/cm$^2$ for 6 to 15 minutes.

Panel 10 made of wood strands united by binder can be obtained by performing the thermal compression molding on the layered material of wood strands 17 until the thickness of the layered material is compressed to ⅓ to 1/30 of the thickness before compression.

Next as shown in FIG. 9, after the panel 10 which was molded in thermal compression is cooled down, the cores 18 are extracted from the panel 10. Consequently after extracting the cores 18, the hollow panel 10 is obtained by trimming the margin of the panel 10.

A device such as a tip saw is used to trim the surface of the panel 10.

The section of the core to be used in present invention is not specified to be only a trapezoid, and bar with various section can be used. More specifically, as shown in FIG. 10A to 10I, the shape of the core can be a square, rectangle, parallelogram, diamond, pentagon, star, circle, ellipse, gourd-shape, and so on. Also, the size of the section of the core is preferably determined according to the thickness of the hollow panel to be molded.

Also the cores to be used in the present invention are formed in taper towards the longitudinal direction of the core, thus the core can be easily extracted after the thermal compression molding of the hollow panel.

Also as shown in FIGS. 11A and 11B, the combined use of different shaped cores is possible in the present invention.

Also, the bar-shape cores to be used in the present invention are made of material which does not deform nor decompose by heat and compression added in thermal compression molding. More specifically, materials such as iron, stainless steel, aluminum, synthetic resin, ceramics, and mixtures of synthetic resin and ceramics can be mentioned.

Also, as an extracting method for the cores from the hollow panel, a drawing method, heating method, smashing method can be mentioned. More specifically, if the core is a metal, all the cores can be extracted easily by pulling the joining board. If the core is a synthetic resin, the core can be extracted easily by heating the cores until they melt. If the core is a ceramic or a mixture of synthetic resin and ceramics, the cores can be extracted easily by vibrating the cores until they are crushed.

Thus a panel similar to that of the first embodiment can also be obtained by the second embodiment.

EXPERIMENTAL EXAMPLE

The first experimental example is explained with a reference to the FIG. 2 as follows.

First Experimental Example

Wood strands 17 approximately 25 mm in length, 5 to 25 mm in width, and 0.3 mm in thickness (average) were made from lumber having water content of 80 to 130% using a disk flaker (wafer producing device).

Next, wood strands 17 were dried at 100° C. for 24 hours using an air drier. The water content of the wood strands after the drying was almost 2%.

Next, 1533 g of obtained wood strands 17 were put in a rolling drum which was rotated in low speed, and the binders were applied by a spraying method to the wood strands during the free-fall of the wood strands in the drum. As a binder, 134 g of crude polymethylene diphenyl diisocyanate (SUMIDUR 44V20 produced by Sumitomo Bayer Urethane Co., Ltd.), solution of 89 g of water-soluble phenol binder (RESITOP PL-4600 produced by Gunei Chemical Industry Co., Ltd.) with 74 g of water, and 60 g of paraffin wax emulsion (SELOSOL 428 produced by Chukyo Yushi Company Ltd.) were used. When the absolute dry weight of the wood strands 17 was 100 parts per weight, the ratio of the amount of the applied binder was SUMIDUR 44V20: 9 parts per weight, RESITOP PL-4600: 3 parts per weight, SELOSOL 428: 2 parts per weight. The order of application was the SELOSOL 428 aqueous solution of PL-4600, and then SUMIDUR 44V20.

Next, the moisture in the wood strands on which the binder was applied was dried and removed, wood strands 17 were obtained by means of the press molding machine. A forming board 15 is put on the bottom of the forming frame 14 with the size of 330 mm in length, 300 mm in width, and 300 mm in height: then, 519 g of the wood strands 17, on which the binder forming the flattened bottom section of the panel 10 were applied were spread to form the first layer.

Next, cores 18 made from the aluminum bar of trapezoidal cross section were disposed at constant interval on the first layer of the wood strands. Additionally, 675 g of wood strands 17, which forms the holed construction of the panel 10, on which the binders were applied were spread on the cores 18 to form the second layer.

Consequently, the cores 18 are disposed on the second layer of the wood strands 17 such that the cores 18 on the second layer are put in the middle area of the cores 18 which were disposed between the first layer and the second layer at a constant interval. In this case, the direction of the trapezoidal cores 18 on the second layer was inverse to the direction of trapezoidal cores 18 which were disposed between the first layer and the second layer. Furthermore, 696 g of the wood strands 17 which was to form the upper flat section of the panel 10 and on which the binder was applied were spread on the cores 18 to form the third layer. Thus, the total thickness of the layered materials was almost 120 mm.

The forming board 16 for the thermal compression molding was disposed on the upper surface of the layered material.

Next, the thermal compression molding was performed on the layered material under the conditions of 180° C. for 8 minutes such that the thickness of the layered material was compressed from 120 mm to 22 mm. The highest pressure was 70 $kg/cm^2$ at this time.

Next, the cores 18 were extracted after the thermal compressed molded panel 10 was cooled down to room temperature.

Consequently, the edges of the panel 10 were trimmed by using a tip saw after extracting the cores 18, and the surfaces of the panel 10 were ground by using a wide belt sander #120, and then the panel 10 with dimensions of 300 mm in length, 270 mm in width, and 20 mm in thickness was obtained.

As a result of measuring the thickness of the panel 10 which was obtained in this way using a density distribution measuring device (Standard ATR Density Profilometer, Type DPM2018 produced by the ATR Company) which measures the density profile in the thickness direction, the density was 0.6 $g/cm^3$.

The second experimental example is explained with a reference to FIG. 2 as follows.

Second Experimental Example

Wood strands 17 approximately 25 mm in length, 5 to 25 mm in width, 0.3 mm in thickness (average) were made from lumber in which the water content is 80 to 130% using a disk flaker (wafer manufacturing device).

Next, wood strands 17 were dried at 100° C. for 24 hours using an air drier. The water content of the wood strands after the dehydration was almost 2%.

Next, 1533 g of obtained wood strands 17 were put in the rolling drum which was rotated at low speed, and the binders were applied by a spraying method to the wood strands during the free-fall of the wood strands in the drum. As a binder, 134 g of crude polymethylene diphenyl diisocyanate (SUMIDUR 44V20 produced by Sumitomo Bayer Urethane Co., Ltd.), solution of 89 g of water-soluble phenol binder (RESITOP PL-4600 produced by Gunei Chemical Industry Co., Ltd.) and 74 g of water, and 60 g of paraffin wax emulsion (SELOSOL 428 produced by Chukyo Yushi Company Ltd.) were used. When the absolute dry weight of the wood strands 17 was 100 parts per weight, the ratio of the amount of the applied binder was, SUMIDUR 44V20: 9 parts per weight, RESITOP PL-4600: 3 parts per weight, and SELOSOL 428: 2 parts per weight.

The order of applying was the SELOSOL 428, aqueous solution of PL-4600, and then SUMIDUR 44V20.

Next, the moisture in the wood strands on which the binder was applied was dried and removed, wood strands 17 were pressed to be formed using the press molding machine. A forming board 15 was put on the bottom of the forming frame 14 with dimensions of 330 mm in length, 300 mm in width, and 300 mm in height, and then 519 g of the wood strands 17, on which the binder forming the flattened bottom section of the panel 10 was applied were spread to form the first layer.

Next, cores 18 made from the aluminum bar having a trapezoidal cross section were disposed at constant interval on the first layer of the wood strands. Additionally, 675 g of wood strands 17, forming the holed construction of the panel 10, on which the binders were applied were spread on the cores 18 to form the second layer.

Consequently, the cores **18*b* which were joined at constant interval by joining board 19*b* were disposed on the second layer of the wood strands 17. When joining the cores 18*b*, the cores 18*b* are disposed such that the cores 18*b* on the second layer are put in the middle area of the cores 18*a* which were disposed between the first layer and the second layer at constant interval. In this case, the direction of the trapezoidal cores 18*b* on the second layer was inverse to the direction of the trapezoidal cores 18*a* which were disposed between the first layer and the second layer. Furthermore, 696 g of the wood strands 17 which was to form the upper flat section of the panel 10 and on which the binder was applied were spread on the cores 18*b*** to form the third layer. Thus, the total thickness of the layered material was almost 120 mm.

The forming board 16 for the thermal compression molding was put on the upper surface of the layered material.

Next, the thermal compression molding was performed on the layered material at 180° C. for 8 minutes such that the thickness of the layered material was compressed from 120 mm to 22 mm. The highest pressure was 70 $kg/cm^2$ at this time.

Next, the cores 18*a* and 18*b* were extracted after the thermal compression molded panel 10 was cooled down to room temperature.

Consequently, the edges of the panel 10 were trimmed by using a tip saw after extracting the cores 18*a* and 18*b*, and the surface of the panel 10 were ground by using a wide belt sander #120, and then the panel 10 having dimensions of 300 mm in length, 270 mm in width, and 20 mm in thickness was obtained.

As a result of measuring the thickness of the panel 10 which was obtained in this way using a density distribution measuring device (Standard ATR Density Profilometer, Type DPM2018 produced by ATR Company) which measures the density profile in the thickness direction, the density was 0.6 $g/cm^3$.

What is claimed is:

1. A manufacturing method for a hollow panel, comprising:

performing thermal compression molding on a layer comprising at least one of herbaceous fibers, fleece or wood elements and a binder, wherein said layer has at least one core is therein; and extracting the core after the thermal compression molding.

2. The manufacturing method for a hollow panel according to claim 1 wherein the wood element is a wood strand.

3. The manufacturing method for a hollow panel according to claim 1 wherein the core is a bar.

4. The manufacturing method for a hollow panel according to claim 3 wherein two or more cores, which are bars having at least one type of cross section, are provided.

5. The manufacturing method for a hollow panel according to claim 3 wherein two ore more cores are joined by a joining board in a direction of a short member of the core.

6. The manufacturing method for a hollow panel according to claim 2 wherein the thickness of the wood strands is 1 mm, or less.

7. The manufacturing method for a hollow panel according to claim 2 wherein the length of the wood strands is within the range of 20 to 150 mm.

8. The manufacturing method for a hollow panel according to claim 2 wherein the width of the wood strands is within the range of 1 to 50 mm.

9. The manufacturing method for a hollow panel according to claim 2 wherein wood strands are disposed unidirectionally.

10. The manufacturing method for a hollow panel according to claim 2 wherein the layer comprises a lamination consisting of a $1^{st}$ lamina and a $2^{nd}$ lamina wherein the direction of the disposition of wood strands of the $1^{st}$ and $2^{nd}$ lamina are different.

11. A manufacturing method for a hollow panel, comprising:

preparing a layer comprising wood elements and a binder, wherein at least one core is provided in the layer;

performing thermal compression molding on the layer; and extracting the core after the thermal compression molding.

12. A manufacturing method for a hollow panel, comprising:

spraying binders onto at least one of herbaceous fibers, fleece or wood elements;

preparing a layer comprising said herbaceous fibers, fleece or wood elements to which the binder has been sprayed, wherein at least one core is provided in the layer;

performing thermal compression molding on the layer; and extracting the core after the thermal compression molding.

13. The manufacturing method for a hollow panel according to claim 1 further comprising preparing said layer comprising at least one of herbaceous fibers, fleece or wood elements and a binder, wherein at least one core is provided in the layer.

* * * * *